UNITED STATES PATENT OFFICE.

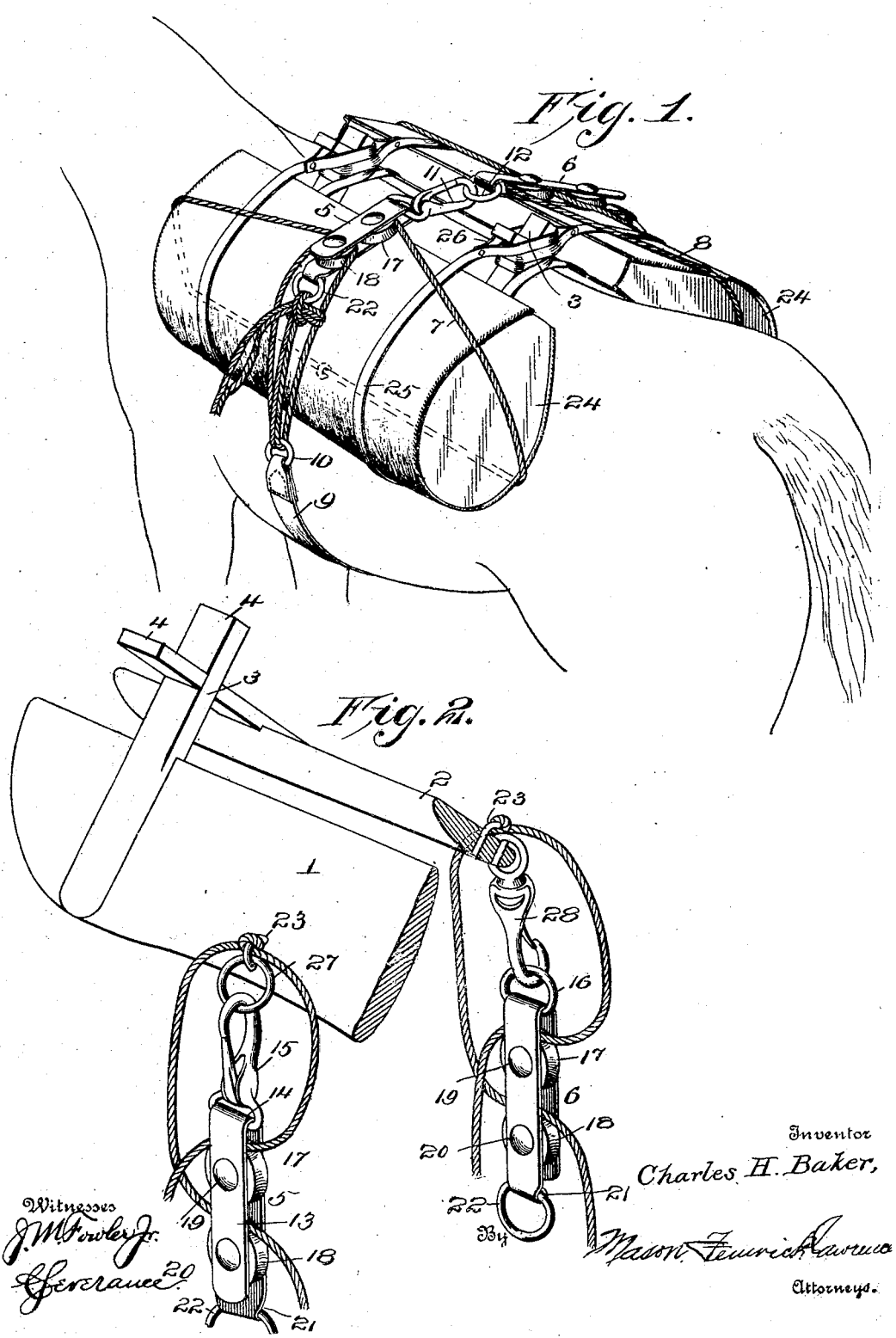

CHARLES H. BAKER, OF REPUBLIC, WASHINGTON.

MEANS FOR FASTENING PACKS ON PACK-ANIMALS.

No. 796,888.          Specification of Letters Patent.          Patented Aug. 8, 1905.

Application filed November 9, 1904. Serial No. 232,061.

*To all whom it may concern:*

Be it known that I, CHARLES H. BAKER, a citizen of the United States, residing at Republic, in the county of Ferry and State of Washington, have invented certain new and useful Improvements in Means for Fastening Packs on Pack-Animals; and I do hereby declare the following to be a full, clear, and exact description of the invention, such as will enable others skilled in the art to which it appertains to make and use the same.

This invention relates to improvements in mechanism for packing or securing loads or packs on the backs of animals, and the mechanism is so constructed that packs or other loads may be easily and quickly placed in position upon an animal or removed therefrom and the fastening means for the pack may be tightened or loosened from either side of the animal.

The invention consists in certain novel constructions, combinations, and arrangements of parts, as will be hereinafter fully described and claimed.

In the accompanying drawings, Figure 1 is a perspective view of a pack-saddle placed upon the back of an animal, the fastening means for securing packs to the saddle being shown properly arranged thereon. Fig. 2 is a perspective view showing a portion of the pack-saddle and the securing-cords and fastening mechanism hanging therefrom.

In employing the pack-securing means forming the subject of the present invention I usually employ a pack-saddle such as that shown in the drawings, in which the two side pieces 1 thereof are made to fit upon the back of an animal and are held in proper relation to each other by cross-trees 3, the upper ends of which project sufficiently, as at 4, to receive means for holding the pouches or bags of the pack in place. Different styles of packs may be employed and secured to the saddle, the important features of the invention residing chiefly in the mode of securing the pack or packs in position upon the saddle.

The means for securing the packs to the saddle comprises connecting purchases or blocks 5 and 6, provided with suitable pulleys and cords or ropes 7 and 8, which are provided with each block. This securing means, taken in connection with the ordinary girth or cinch 9, affords ample means for securely fastening a pack upon each side of a saddle. The said cinch or girth 9 is preferably a broad band of any desired material and is provided at its ends with rings 10. One of the blocks, as 5, is provided with a snap-hook 11, which is arranged at the end of the block so that it can be secured to an eye 12, carried by the adjacent end of the opposite block 6. The blocks may be formed in any suitable manner, provided they are so shaped that they may carry a plurality of pulleys and may have fastening means or rings at each end. A simple and yet effective manner of constructing the purchases or blocks 5 and 6 is shown in the drawings, in which a strap of metal, as 13, is used and folded to form a loop 14 at one end, in which is secured a snap-hook or ring, as the case may be. Upon the block 5 a snap-hook 15 is used, while upon the block 6 a ring 16 is employed. The strap of metal is made of sufficient length to permit the pulleys, preferably two in number, as 17 and 18, to be mounted between the folded portions thereof. The bolts or pivot-pins 19 and 20, which hold the pulleys in place, also serve to secure the sides of the block with respect to each other. One side of each block is extended sufficiently to form an eye by which a ring 22 can be secured to that end of the block. A single rope or cord is all that is required for each block, and each cord is secured to the pack-saddle by fastening it to a staple 23, as clearly shown in Fig. 2. The cord is then passed in long loops which are designed for receiving the pack to the pulleys 17 and 18, one end of the cord passing inwardly through the block from one side thereof and thence around the pulley 17 and usually along one side of the block, while the other end of the cord or rope passes into the block from the opposite side and around the pulley 18 and thence downwardly to the cinch or girth 9. The two ends of the cord are preferably secured together, so that they will not become readily entangled. It is useful also to have the ends of the cords secured together, for the reason that the two cords are always drawn through the rings of the girth and of the blocks at the same time. The portions of the cord pass downwardly upon opposite sides of the block, since the pull upon the pack is from the opposite ends thereof, as clearly illustrated in Fig. 1, and the joined ends of said cord are then passed through the ring 10 of the girth and thence upwardly through the ring 22 of the block upon that side of the saddle. The ends of the cord are then tied or otherwise made fast to said ring. The cords upon the opposite side of the saddle are placed around the other portion of the pack in the manner just described, and the two blocks are secured together by snapping the hook 11 into the ring 12, as shown in Fig. 1. Of course it will be evident that I do not wish to confine myself to the employment of a single cord upon each side of the saddle, for it will be evident that two or more cords might be employed and secured firmly at one end to the staple upon the saddle, while the other ends of each cord are passed about the pack and through the block, as above set forth. Since the cords are secured at the lower ends of the blocks upon each side of the animal, it will be evident that the pack may be tightened or loosened from either side of the animal by adjusting the cord at the ring in the lower end of the block. The pull of the cord upon one side of the pack-saddle is of course transferred to the cord upon the other side of said saddle through the connection of blocks across the top of the pack. There are no parts of the fastening-cords which extend across the top of the pack-saddle, the only connection extending across from one cord to the other being the connected blocks. For this reason it will be seen that the pack-securing cords can be readily and quickly thrown off from the portions of the pack by merely disconnecting the blocks. As soon as the blocks are unhooked they may be thrown to one side, and the securing-cords will immediately fall from their positions about the packs.

While the packs may be of any preferred style, I have shown in the drawings two open receptacles or pack-bags 24, which are usually open at the top, and the said pack-bags may be suspended from the cross-trees 3 by means of straps or cords 25, which are formed with loops 26 in their ends. The loop of one end of a strap is first placed upon the ends 4 of the cross-trees and then passed around the pouch or pack-bag and then the other end is slipped over the ends of the cross-trees. The cross-trees may thus be used to support the pouches upon each side of the pack-saddle, as shown in the drawings.

When the packs are removed from the saddle and the animal is to return for a new load, the blocks 5 and 6 are fastened one to the ring 27, secured to the saddle, and the other to the snap-hook 28, also secured to the saddle, as illustrated in Fig. 2. The loose portions of the cords or ropes may be hung over the trees of the saddle.

It will be evident that when a new pack is to be placed upon the saddle it is only necessary to disconnect the blocks from their fastenings and secure them together over the top of the pack, when the cords may be arranged around the ends of the packs and secured in position, as above set forth.

With the mechanism above described it will be evident that any one can secure or release a pack whether they are acquainted with the various hitches or securing devices which are in common use or not. It requires no knowledge on the part of the manipulator of the packing device of the various kinds of hitches and fastenings to place the cords about the pack and draw the ends thereof through the rings of the girth and the block in order to tightly draw the pack into place. The pack-securing means described can be readily accommodated to all styles of packs or packages which it may be necessary to secure to the back of an animal and will of course be capable of receiving packs or bundles of various sizes. Since the cords pass around the ends of the pack as well as about the sides thereof, the pack cannot easily work loose or become disengaged from its position upon the saddle.

The device is exceedingly simple in its construction and not likely to get out of order.

Having now described my invention, what I claim as new, and desire to secure by Letters Patent, is—

1. A pack-securing device for pack-saddles comprising a pack-inclosing cord, a block having a plurality of pulleys for receiving the pull of the cord, as it comes from each end of the pack, and means for securing the ends of the cord at the side of the pack.

2. A pack-securing means comprising side cords, pulleys for receiving the cords and facilitating a pull upon their opposite ends, means for connecting the pulleys for transferring the pull of one cord to the other, and means for securing the cords to the girth of the saddle.

3. A pack-securing mechanism for pack-saddles comprising a separate cord secured to each side of the saddle, pulleys connected across the top of the pack and receiving the cords, a girth for receiving the pull of the cords, and securing-rings carried by the pulleys through which the ends of the cords may be fastened.

4. A pack-securing device for pack-saddles comprising cords and double pulleys, the double pulleys receiving the ends of the cords from each end of the pack, a connecting-clasp interposed between the pulleys for transferring the pull of one cord to the cord upon the other side of the pack, and means for securing the ends of the cords when they are tightened.

5. A pack-securing device comprising a pair of cords one fastened to each side of a pack-saddle, a block provided on each side of the pack and formed with pulleys arranged in alinement in the same plane, means for connecting the blocks, a girth for securing the ends of the cords and fastening-rings carried by the blocks, the cords entering the pulleys in opposite directions.

6. A pack-fastening mechanism comprising cords, pulley-blocks engaging the same, the cords passing into the pulley-blocks from opposite sides thereof, and means for securing the cords at their ends.

7. A pack-fastening device comprising outwardly-extending loops of cord or rope, double pulleys for the said loops made up of straps of metal folded to form opposing walls for the blocks, pulleys pivoted between the said walls, and securing means at the ends of the straps.

8. A pack-fastening device comprising outwardly-projecting loops of cord one for each side of the pack, a pulley-block for each loop, a ring upon one block, a snap-hook upon the other for engaging the ring of the former block and holding the two sides of the pack-securing mechanism together, and means for fastening the ends of the cords.

9. A pack-securing device comprising two portions one for each side of a pack-saddle, each portion being made up of a rope and a double block, and means for connecting the two blocks.

10. A pack-securing device comprising side cords arranged to form outwardly-extending loops for the pack, means for drawing the cords together at the center, said means being provided with cord-engaging pulleys, means for securing the cord to a pack-saddle, a girth for holding the cords at the side, and means for securing the ends of the cords.

In testimony whereof I have signed my name to this specification in the presence of two subscribing witnesses.

CHARLES H. BAKER.

Witnesses:
   CHARLES P. BENNETT,
   G. W. FAIRWEATHER.